United States Patent [19]

Itoh et al.

[11] 3,942,096
[45] Mar. 2, 1976

[54] VOLTAGE REGULATING SYSTEM
[75] Inventors: Katsumi Itoh, Ohbu; Kazumasa Mori, Aichi, both of Japan
[73] Assignee: Nippondenso Co., Ltd., Kariya, Japan
[22] Filed: Sept. 26, 1974
[21] Appl. No.: 509,635

[30] Foreign Application Priority Data
Oct. 1, 1973 Japan.............................. 48-110738

[52] U.S. Cl................. 322/28; 317/33 VR; 320/64
[51] Int. Cl.² .......................................... H02H 7/00
[58] Field of Search ................. 322/28; 320/64, 68; 317/33 R, 33 VR

[56] References Cited
UNITED STATES PATENTS
3,539,864  11/1970  Harland, Jr. et al.............. 322/28 X
3,710,227  1/1973  Hill................................... 322/28 X Primary Examiner—J. D. Miller
Assistant Examiner—Robert J. Hickey
Attorney, Agent, or Firm—Cushman, Darby & Cushman

[57] ABSTRACT

In a voltage regulating system, a protective transistor has its collector connected to a base of a power transistor which controls field current of a battery charging generator and its base connected via voltage dropping element to a collector of a control transistor which controls the power transistor in response to a battery voltage whereby an uncontrolled high voltage which takes place during disconnection of a voltage regulator to a battery is prevented in such a manner that the protective transistor controls the power transistor to cut off the field current.

6 Claims, 2 Drawing Figures

VOLTAGE REGULATING SYSTEM

BACKGROUND OF THE INVENTION

1. Field of the Invention

The present invention relates to a voltage regulating system for automotive vehicles, which is preferably of the transistor type and especially relates to a system which is capable of regulating the output voltage of a battery charging generator even when the battery becomes disconnected from the generator and when the normal voltage sensing circuit of the voltage regulator becomes disconnected from the battery.

2. Description of the Prior Art

A conventional well-known voltage regulator of this kind is provided with an output transistor for controlling field current flowing through a field winding of a battery charging generator, a voltage sensing circuit for sensing the output voltage of the generator and a transistor circuit including a control transistor effected by the voltage sensing circuit and controlling the output transistor. The field winding is supplied with current by three auxiliary diodes connected to the battery charging generator, the voltage sensing circuit is connected across the battery so as to detect the battery charging voltage, and the battery and a bridge rectifier are connected by means of a power supply cable. However in this conventional voltage regulator, if a positive terminal of the bridge rectifier becomes disconnected or if the voltage sensing circuit becomes disconnected the output transistor of the voltage regulator is continuously biased conductive, which would result in such an uncontrolled high voltage as destroy electrical components of the system.

SUMMARY OF THE INVENTION

It is accordingly a primary object of the present invention to provide a voltage regulating system which will reduce the output voltage of the generator substantially to zero whenever the voltage sensing circuit becomes disconnected from the battery. For this purpose, protective transistor is connected between the output transistor and the control transistor in order to make the output transistor nonconductive whenever the voltage sensing circuit becomes disconnected from the battery.

It is another object of the present invention to provide a voltage regulating system which controls the output voltage of the generator at another preset level when the rectifier of the generator becomes disconnected from the battery, whereby the uncontrolled high voltage is prevented.

Still another object of the present invention is to provide a voltage regulating system of simple and low in costs.

DESCRIPTION OF THE PREFERRED EMBODIMENT

Figure 1:
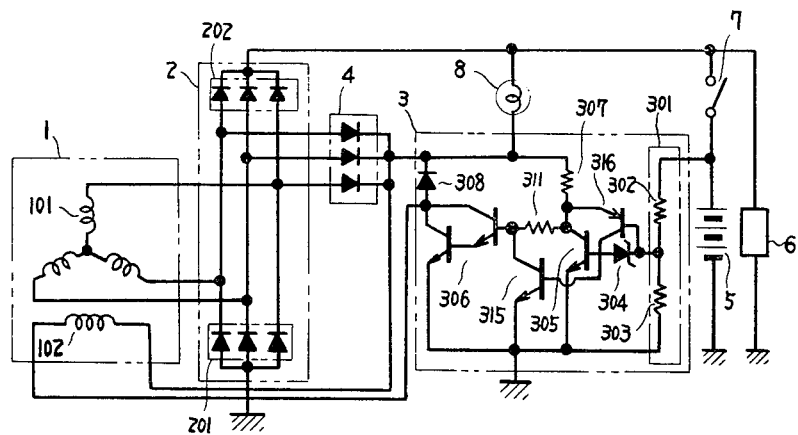
FIG. 1 is a schematic circuit diagram of a voltage regulating system in accordance with the present invention.

Referring now to FIG. 1, an electrical power supply system for an automotive vehicle is illustrated, in which an alternating current generator generally used as a battery charging generator is designated by reference numeral 1 which has a three phase Y-connected generating winding 101 and a field winding 102. A full-wave bridge rectifier 2 consisting of two groups of diodes 201 and 202 is connected to the generator 1 for rectifying its alternating current.

Numeral 3 designates a voltage regulator to control the output voltage of the generator 1 at a predetermined level, wherein a voltage sensing circuit 301 consisting of voltage dividing resistors 302 and 303 is connected to a positive terminal of a battery 5, a zener diode 304 is connected to the junction point of the resistors 302 and 303, a control transistor 305 is connected to the zener diode 304 at its base and to a Darlington amplifier 306 at its collector through a resistor 311, a resistor 307 is connected to the collector of the control transistor 305, a diode 308 is connected to the collector of the Darlington amplifier 306 in parallel with the field winding 102 being a collector load of an output transistor of the Darlington amplifier 306, a protective transistor 315 is connected to a junction point of the amplifier 306 and the resistor 311 at its collector and at its base to a collector of a PNP transistor 316 whose emitter is connected to the collector of the control transistor 305 and whose base is connected to the voltage sensing circuit 301. Numeral 4 designates auxiliary diodes connected to the field winding, 6 an electrical component installed in the automotive vehicle, 7 a key switch, and 8 an indicating lamp.

The operation of the first embodiment shown in FIG. 1 will now be described.

When the key switch 7 is closed, since the voltage sensing circuit 301 detects a divided voltage of the battery insufficient to make the control transistor 305 conductive, an electric current of the battery 5 flows through the indicating lamp 8 to the Darlington amplifier 306, whereby the output transistor of the Darlington amplifier 306 is made conductive. Therefore the field winding 102 of the generator 1 will be energized from the battery 5 to provide initial excitation for the field winding.

When the engine of the automotive vehicle starts to rotate and drives the generator 1, the output voltage of the generator rises and is maintained at a desired level by the voltage regulator 3. The indicating lamp 8 is extinguished when the voltage from the bridge rectifier 2 becomes approximately the same as that from the auxiliary diodes 4. As the output voltage of the generator 1 rises above a predetermined level the zener diode 304 is broken down to make the control transistor 305 conductive. Thus, the output transistor of the Darlington amplifier 306 is made non-conductive, and the field current flows through the diode 308, the control transistor 305 and to the ground, with a gradual decrease of the output voltage of the generator 1. At this stage, since the generator 1 is still generating the voltage the indicating lamp 8 is kept extinguished.

When the output voltage of the generator 1 drops below the predetermined level the zener diode 304 and consequently, the control transistor 305 are made non-conductive, thereby to make the output transistor of the Darlington amplifier 306 conductive to flow the field current through the field winding 102, whereby the output voltage of the generator 1 rises again. Thus, the above described operation is repeated to control and maintain the battery voltage at a desired level.

In case that the voltage sensing circuit 301 becomes disconnected from the battery 5, the PNP transistor 316 becomes conductive since the base potential thereof drops to the ground level, and the protective transistor 315 is made conductive due to electric current supplied from the generator 1 through the PNP transistor 316. Accordingly the output transistor of the Darlington amplifier 306 is made nonconductive to thereby reduce the output voltage of the generator, whereby the bridge rectifier 2, the voltage regulator and the electrical components 6 are protected from high voltage at the generator 1.

When the diodes 202 of the bridge rectifier 2 becomes disconnected from the battery 5, the voltage sensing circuit 301 detects the battery voltage which is not enough to break down the zener diode 304, and therefore, the control transistor 305 is kept at nonconductive condition. The output voltage of the generator 1 rises gradually, since the output transistor of the Darlington amplifier 306 is kept conductive, so that the electrical potential at a junction point of the resistors 307 and 311 increases. When the potential becomes higher than that at a junction point of the voltage dividing resistors 302 and 303 by a break down voltage of the PNP transistor 316, the transistor 316 is made conductive, the protective transistor 315 is also made conductive, whereby the output transistor of the Darlington amplifier 306 is made nonconductive, thus preventing the uncontrolled high voltage even when the battery 5 is disconnected from the bridge rectifier.

Figure 2:
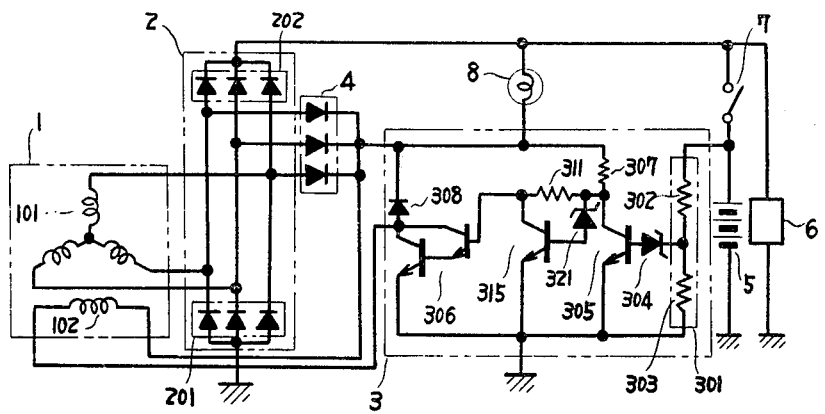
FIG. 2 is another schematic circuit diagram of a voltage regulating system.

Next referring to FIG. 2 showing the second embodiment of the present invention, since difference between first and second embodiment resides in the voltage regulator, only the difference will be described. Numeral 321 designates a zener diode connected to the junction point of the resistor 307 and 311 at its cathode and connected to the base of the protective transistor 315 at its anode. The values of the resistors 307 and 311 are so selected that electrical potential appearing at the junction point thereof during normal operation of this system may not break down the zener diode 321 but break down when the output voltage of the generator 1 rises above a predetermined level. The normal operation of the above described embodiment is almost the same as that of the first embodiment, and therefore, only what is different will be explained.

When the voltage sensing circuit 301 becomes disconnected from the battery 5 or the battery 5 is disconnected from the bridge rectifier 2, the zener diode 304 and the control transistor 305 are made non-conductive, and therefore, the output transistor of Darlington amplifier 306 is maintained conductive, whereby the output voltage of the generator 1 is gradually increased. When the electrical potential at the junction point of the resistors 307 and 311 reaches the value where the zener diode 321 is broken down, the protective transistor 315 is made conductive in accordance with the break down of the zener diode 321 and the output transistor of the Darlington amplifier 306 is switched off to reduce the output voltage of the generator 1. As the result, the zener diode 321 returns to the nonconductive state and the output voltage of the generator 1 is increased again. The above operation is repeated to control the output voltage of the generator 1 at a certain level which is higher than the level controlled by the voltage sensing circuit 301.

In the above embodiments, the resistor 311 may be replaced by a zener diode, a diode or a combination thereof.

What we claim is:

1. A voltage regulating system for an automotive vehicle comprising;
    an alternating current generator having an output winding and a field winding;
    a first rectifier circuit connected to said output winding;
    a second rectifier circuit connected to said output winding and for providing field energizing terminals;
    a storage battery connected to said first rectifier circuit;
    a field energizing transistor for connecting said field winding across said field energizing terminals;
    a voltage sensing circuit connected across said storage battery for providing a present level and for detecting a battery voltage in accordance with said preset level;
    a control transistor connected to said voltage sensing circuit at its base and being driven into thereby a conductive state when said battery voltage exceeds said preset level, the collector-emitter path of said control transistor being connected across said field energizing terminals;
    the base of said field energizing transistor being connected to the collector of said control transistor, whereby said field energizing transistor is driven into the nonconductive state when said battery voltage exceeds said preset level, by bypassing the base current thereof through said control transistor;
    a protective transistor, whose collector-emitter path is connected between the base and emitter of said field energizing transistor, for bypassing the base current of said field energizing transistor; and
    an over-voltage detecting means connected between the collector of said control transistor and the base of said protective transistor and for driving said protective transistor into the conductive state when the voltage across said field energizing terminals exceeds a predetermined value which is higher than said preset level.

2. A voltage regulating system as set forth in claim 1 further comprising;
    a first resistor connected between the collector of said control transistor and the positive terminal of said field energizing terminals; and
    a second resistor connected between the collector of said control transistor and the base of said field energizing transistor.

3. A voltage regulating system as set forth in claim 2, wherein said over-voltage detecting means comprises a PNP transistor whose emitter-collector path is connected between the collector of said control transistor and the base of said protective transistor and whose base is connected to said voltage sensing circuit.

4. A voltage regulating system as set forth in claim 2, wherein said over-voltage detecting means comprises a zener diode.

5. A voltage regulating system as set forth in claim 1 further including a second field energizing transistor connected in Darlington configuration to the first field energizing transistor and connecting the collector of said control transistor to said base of said protective transistor.

6. A voltage regulating system for an automotive vehicle comprising;
    a voltage sensing circuit to be connected across a battery mounted in an automotive vehicle;

a control transistor connected to said voltage sensing circuit at its base and being driven into the conductive state when a voltage supplied to said voltage sensing circuit exceeds a predetermined value, a collector-emitter path of said control transistor being to be connected across direct current terminals of a generator mounted in said automotive vehicle;

a field energizing transistor for connecting a field winding of said generator across said direct current terminals, the base of said field energizing transistor being connected to the collector of said control transistor, whereby said field energizing transistor is driven into the nonconductive state when said control transistor is driven into the conductive state;

a protective transistor, whose collector-emitter path is connected between the base and emitter of said field energizing transistor, for bypassing the base current of said field energizing transistor;

an over-voltage detecting means connected between the collector of said control transistor and the base of said protective transistor and for driving said protective transistor into the conductive state when the voltage appearing across said direct current terminals exceeds another predetermined value.

* * * * *